United States Patent
Cumby et al.

(10) Patent No.: US 11,387,013 B1
(45) Date of Patent: Jul. 12, 2022

(54) RESIDUE FREE ELECTRICALLY CONDUCTIVE MATERIAL

(71) Applicant: Government of the United States as represented by the Secretary of the Air Force, Wright-Patterson AFB, OH (US)

(72) Inventors: Brad L Cumby, Liberty Township, OH (US); Christopher Tabor, Kettering, OH (US)

(73) Assignee: United States of America as represented by the Secretary of the Air Force, Wright-Patterson AFB, OH (US)

(*) Notice: Subject to any disclaimer, the term of this patent is extended or adjusted under 35 U.S.C. 154(b) by 36 days.

(21) Appl. No.: 16/991,222

(22) Filed: Aug. 12, 2020

Related U.S. Application Data

(63) Continuation-in-part of application No. 15/986,292, filed on May 22, 2018, now Pat. No. 10,784,011.

(60) Provisional application No. 62/510,629, filed on May 24, 2017.

(51) Int. Cl.
| | |
|---|---|
| H01B 5/00 | (2006.01) |
| H01B 13/00 | (2006.01) |
| B01J 13/08 | (2006.01) |
| H01B 1/22 | (2006.01) |
| H01B 1/02 | (2006.01) |

(52) U.S. Cl.
CPC ............... *H01B 5/00* (2013.01); *B01J 13/08* (2013.01); *H01B 13/0026* (2013.01); *H01B 1/02* (2013.01); *H01B 1/22* (2013.01)

(58) Field of Classification Search
None
See application file for complete search history.

(56) References Cited

U.S. PATENT DOCUMENTS

| | | | |
|---|---|---|---|
| 2,864,695 | A | 12/1958 | Smith et al. |
| 4,659,384 | A | 4/1987 | Diago et al. |
| 5,792,236 | A | 8/1998 | Taylor et al. |
| 5,800,060 | A | 9/1998 | Speckbrock et al. |
| 6,019,509 | A | 2/2000 | Speckbrock et al. |
| 6,544,353 | B2 | 4/2003 | Bonneviot et al. |

(Continued)

FOREIGN PATENT DOCUMENTS

| | | |
|---|---|---|
| EP | 0394049 A1 | 10/1990 |
| WO | 2010071574 A1 | 6/2010 |
| WO | 2015089309 A1 | 6/2015 |

OTHER PUBLICATIONS

Kim, Daeyoung; Yoo, Jun Hyeon; Lee, Yunho; Choi, Wonjae, "Gallium-Based Liquic Metal Inkjet Printing," Micro Electro Mechanical Systems, Jan. 2014, pp. 967-970 (Abstract only).

(Continued)

*Primary Examiner* — Jeffrey D Washville
(74) *Attorney, Agent, or Firm* — AFMCLO/JAZ; James F. McBride

(57) ABSTRACT

A deformable yet mechanically resilient microcapsule having electrical properties, a method of making the microcapsules, and a circuit component including the microcapsules. The microcapsule containing a gallium liquid metal alloy core having from about 60 to about 100 wt. % gallium and at least one alloying metal, and a polymeric shell encapsulating the liquid core, said polymeric shell having conductive properties.

12 Claims, 1 Drawing Sheet

(56) References Cited

U.S. PATENT DOCUMENTS

| | | | |
|---|---|---|---|
| 7,033,524 | B2 | 4/2006 | Kumacheva |
| 8,329,501 | B1 | 12/2012 | Robinson et al. |
| 8,691,116 | B2 | 4/2014 | Han et al. |
| 2008/0236444 | A1 | 10/2008 | Enciu et al. |
| 2008/0241262 | A1* | 10/2008 | Lee .................. B22F 1/054 424/490 |
| 2009/0260670 | A1 | 10/2009 | Li |
| 2012/0067615 | A1* | 3/2012 | Blaiszik .................. H01B 1/02 174/110 R |
| 2014/0051242 | A1 | 2/2014 | Lockett et al. |
| 2014/0147959 | A1 | 5/2014 | Raccurt et al. |

OTHER PUBLICATIONS

Dickey, Michael D.; Chiechi, Ryan C.; Larsen, Ryan J.; Weiss, Emily A.; Weitz, David A.; Whitesides, George M., "Eutectic Gallium-Indium (EGaIn); A Liquid Metal Allow for the Formation of Stable Structures in Microchannels At Room Temperature," Adv. Funct. Mater, 2008, No. 18, pp. 1097-1104.

Dickey, Michael D., "Emerging Applications of Liquid Metal Featuring Surface Oxides," ACS Publications, Sep. 17, 2014, pp. A-K.

Surapaneni, Rajesh, Xie, Yan, Park, Kyungjin, Mastrangelo, Carlos, "Microfabrication of Flexible Self-Repairing Ground Reaction Sensor With Liquid Metal Electrodes," Procedia Engineering, No. 25, Elsevier Ltd, 2011, pp. 124-127.

Zheng, Yi; He, Zhi-Zhu; Yang, Jun; and Liu, Jing, "Personal Electronics Printing Via Tapping Mode Compositie Liquid Metal Ink Delivery Ad Adhesion Mechanism," Scientific Reports, 4: 4588, Apr. 4, 2014, pp. 1-8.

Moynihan, Matthew J.,"Double Emulsion Generation in the Mass Production of Inertial Confinement Fusion Targets Using T-Junctions," Dept. Chem. Engr., University of Rochester, New York, 2013, pp. 1-247.

Tian, Lu; Gao, Meng; Gui, Lin; "A Microfluidic Chip for Liquid Metal Droplet Generation and Sorting," Micromachines, 2017, vol. 8(2), 39, 15 pages.

* cited by examiner

RESIDUE FREE ELECTRICALLY CONDUCTIVE MATERIAL

This application is a continuation-in-part of co-pending U.S. patent application Ser. No. 15/986,292, filed May 22, 2018, which in turn claims the benefit of and priority to prior filed Provisional Application Ser. No. 62/510,629, filed 24 May 2017, both of said applications being expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The disclosure is directed to electrically conductive materials, in particular to polymer encapsulated liquids that are electrically conductive, circuit components containing the polymer encapsulated liquids, and methods for making the polymer encapsulated, electrically conductive materials.

BACKGROUND AND SUMMARY

The recent surge in flexible and stretchable electronics (FSE) research and development has compelled researchers to develop materials and processes that are well-suited toward the advancement of FSE technology. Flexible and stretchable electronics are complete electronic circuits that have the ability to undergo reversible deformation while maintaining their intended functionality.

There are numerous commercial applications for FSE circuits. Electronic materials that can be printed with small feature size and highly tunable properties without the requirement of aggressive post-processing are applicable to flexible electronics in the consumer electronics market as well as health and sports health monitoring markets to name a few, where products are required to be printed quickly (roll-to-roll fashion) and in high throughput with reliable functional operation parameters. Printing of electrical contacts pads, flip-chip bump bonding for integrated circuits, flexible integrated antennas, among other uses are quickly identifiable.

Current state-of-the-art approaches to fabricating conductors which can survive elastic stretching involve an "island-plus-serpentine" approach wherein rigid (non-stretching) electrical components are connected electrically using meandering (serpentine) solid metal interconnects. By employing this type of curved geometry to fabricate the device interconnects, localized strains are drastically reduced resulting in an overall device elasticity that far exceeds that of the conducting metals in their bulk form. Though the island-plus-serpentine approach has indeed met with a certain degree of success, several limitations have fostered continued research into alternative options. For instance, serpentine patterns require more "real estate" in the device layout, higher stretching can only be achieved where interconnects are not bonded to the substrate, and interconnects are prone to failure after repeated stretching cycles.

Conductive liquids offer an unprecedented level of mobility and agility in the field of reconfigurable electronics. There are a variety of conducting fluids available, ranging from highly conductive liquid metals to more resistive metal colloid loaded dielectric fluids, and even include ionic conductive fluids. However, these conductive fluids need to be contained within channels or vascular structures, and individual droplets will coalesce with one another due to surface energy minimization and Laplace pressure gradients, limiting their structurally dictated electromagnetic properties.

One of the most useful electrically conductive fluids are gallium based alloys. However, gallium based alloys form a thin oxide shell on the surface of the metal that hinders mechanical reconfigurability. This oxidation creates contamination issues in a device due to the fact that the liquid metal oxide adheres to many surfaces leaving a residue behind. The formation of residue has led to many devices requiring the use of a corrosive (acidic/basic) environments to lessen the effects of the oxide. While this approach has been experimentally proven, the use of acidic/basic environments leads to corrosion of the metallic interfaces as well as alloying between that of the liquid metal and surrounding metallic contacts. As a result, there is a need for a solution that allows liquid metal devices to avoid such effects without compromising the advantage of being reconfigurable.

In view of the foregoing, embodiments of the disclosure provide a deformable yet mechanically resilient microcapsule having electrical properties, a method of making the microcapsules, and a circuit component including the microcapsules. The microcapsule containing a gallium liquid metal alloy core having from about 60 to about 100 wt. % gallium and at least one alloying metal, and a polymeric shell encapsulating the liquid core, said polymeric shell having conductive properties.

In one embodiment, there is provided a method for making deformable microcapsules containing a gallium liquid metal alloy core. The method includes the steps of (1) providing a double-T-junction apparatus having a first T-junction and a second T-junction; (2) flowing at a rate of about 0.1 mL/Hr a gallium liquid metal alloy emulsion to the first T-junction containing a first aqueous carrier fluid to form first droplets in the first aqueous carrier fluid at a rate of about 100 mL/Hr; (3) flowing at a rate of about 0.1 mL/Hr the first droplets to the second T-junction containing an emulsion of a polymerizable material in a second carrier fluid flowing at a rate of about 100 mL/Hr to form second droplets containing the first droplets as a core and the polymerizable material as a shell; and (4) polymerizing the polymerizable material to provide the deformable microcapsules containing the gallium liquid metal alloy core, wherein the shell of the deformable microcapsules has conductive properties.

A further embodiment provides a deformable circuit component having electrical properties. The circuit component has an electrical element containing microcapsules having electrical properties. The microcapsules contain a gallium liquid metal alloy core having from about 60 to about 85 wt. % gallium and at least one alloying metal, and a polymeric shell encapsulating the liquid core, wherein the polymeric shell has conductive properties.

In some embodiments, the gallium liquid metal alloy is a gallium and indium alloy. The gallium indium alloy may also contain tin. Accordingly, in some embodiments, the gallium liquid metal alloy may include about 62 wt % to about 95 wt % gallium; about 5 wt % to about 22 wt % indium; and about 0 wt % to about 16 wt % Sn.

In other embodiments, the alloying metal of the gallium liquid metal alloy may be selected from tin, silver, gold, thalium, cesium, palladium, platinum, sodium, selenium, lithium, potassium, zinc, copper, cadmium, bismuth, indium, antimony, lead, and combinations of two or more of the foregoing.

In some embodiments, the deformable microcapsule has a polymeric shell thickness ranging from about 10 to about 20 microns and a core volume ranging from about 50 to about 200 microliters. The deformable microcapsule may have a mean particle diameter ranging from about 100 μm to about 1 mm.

In some embodiments, the polymeric shell of the deformable microcapsule may be coated with an electrically conductive material.

In other embodiments, the polymeric shell may be made of a polymerizable material selected from poly(alkyl-methacrylate), polysiloxane, polyurethane, poly(aniline), polypyrrole, polythiophene, poly(ethylenedioxythiophene), and poly(p-phenylene vinylene), wherein the polymerizable material contains a conductive material component.

The foregoing embodiments are described in more detail below and may overcome challenges of using flexible circuit materials by encapsulating the liquid metal within a polymer shell. The polymeric shell being elastic will provide mechanical resiliency while providing a protective layer against conducive fluid coalescence. For applications requiring electrically intimate contact, the polymeric shell may be electrically conductive. For applications where the contact is required to be ionically conductive, the elastomer of the polymeric shell may be chosen to be ionically conductive. Most conductive polymers, especially under mechanical stress, exhibit lower conductivity compared with conductive fluids. Therefore, the encapsulation of a liquid conductor within a thin conductive polymeric shell provides a superior material solution to applications that require a mechanical resiliency and conductivity, compared with a conductive elastomeric polymer devoid of a liquid metal core.

DETAILED DESCRIPTION OF DISCLOSED EMBODIMENTS

Figure 1:
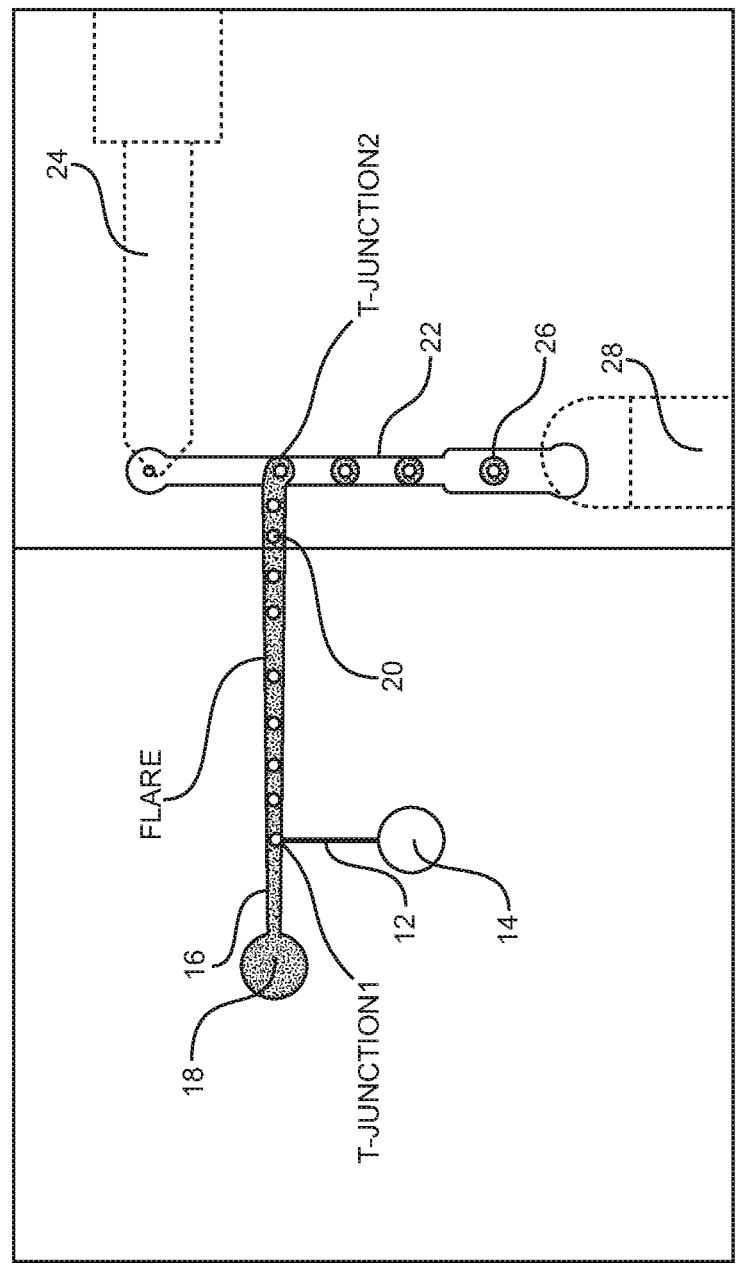
FIG. 1 is a schematic illustration of a double T-Junction for use in making deformable microcapsule having electrical properties.

In hopes of achieving a more elegant, versatile, and robust solution to stretchable conductors, researchers have been examining eutectic blends of Gallium-Indium (eGaIn) and Gallium-Indium-Tin (GaInSn) in earnest as these room temperature liquid metal alloys are inherently stretchable, are non-toxic, and have excellent conductivity. Several groups have already begun to explore the use of Gallium liquid metal alloys (GaLMAs) in multiple FSE applications including strain gauges, stretchable capacitors, reconfigurable antennas, and self-healing circuits.

Embodiments of the disclosure provide a method to encapsulate a GaLMA liquid conductor within a conductive elastomeric shell. The elastomeric shell may be formed by means of core-shell microfluidic encapsulation process. The encapsulation process involves linear channels such that one channel will confine the core material (in this case the liquid GaLMA), one channel will contain the shell material (pre-cured elastomer), and another channel will surround the core material with the shell material and carry the core-shell droplet to a curing area. The foregoing procedure is very similar to that shown in FIG. 1.

In FIG. 1, a double T-Junction 10 in operation is viewed from the top, looking down. Channel 12 provides a core material such as GaLMA from a core material source 14 through T-Junction 1 to channel 16 containing a source 18 of aqueous fluid. T-Junction 1 causes the formation of discrete particles 20 of GaLMA to form in the aqueous fluid by adjusting the flow of the aqueous fluid releative to the flow of GaLMA into T-Junction 1. The outlet of T-Junction 1 provides an aqueous stream containing the discrete particles 20 of GaLMA for continuous flow to T-Junction 2. The continuous fluid becomes the dispersed fluid as it flows through T-Junction 2 into channel 22. A source of shell material in an organic carrier fluid is provided from conduit 24 to the channel 22 so that it encapsulates the discrete particles of GaLMA from channel 16 as the combined material emerges as a shell and core material 26 from T-Junction 2 into channel 22. The shell and core material 26 then flows to a curing area 28 where excess shell material and/organic carrier fluid is removed and the shell of the shell and core material 26 is cured.

All three channels 12, 16 and 22 can be perpendicular to one another and these channels, with their respective material, can have flow rates that cause the formation of the discrete particles 20 of GaLMA in channel 16 and the encapsulated particles 26 in channel 22. The flow rates will be determined such that the rate enables the core material (GaLMA) 20 to enter the shell material (polymeric elastomer) channel 22 but only part way so that the core material 20 is sliced into sections that will be surrounded and carried by the shell material 24 through the encapsulating channel 22.

For example, the flow rate of gallium liquid metal alloy forming the core material to T-Junction 1 may range from about 0.05 to about 0.115 mL/Hr. The aqueous carrier fluid 18 for the gallium liquid metal alloy in channel 16 may have a flow rate ranging from about 80 mL/Hr to about 120 mL/Hr. The aqueous carrier fluid may also contain an oxide reducing compound such as NaOH to prevent the formation of an oxide coating on the gallium liquid metal alloy. As set forth above, the oxide coating on the gallium liquid metal alloy may cause corrosion problems if the core material were to escape from the shell material. However, in other embodiments, the gallium liquid metal alloy may also contain an oxide coating.

The polymerizable material in channel 22, forming the shell of the core/shell microcapsule, may be provided in a second carrier fluid to T-Junction 2. Accordingly, the flow rate of polymerizable material 24 in the second carrier fluid may range from about 80 mL/Hr to about 120 mL/Hr. The second carrier fluid may be selected from a wide variety of organic solvents, including but not limited to, toluene, xylene, ethanol, propanol, and the like. An organic material that is readily evaporated or removed from the cured microcapsules is particularly preferred.

The resulting core/shell material 26 and carrier fluid in channel 22 may have a combined flow rate ranging from about 160 mL/Hr to 200 mL/Hr. The curing area 28 may be an extension of the carrier material channel 22 or an external containing area that will also have the carrier material. The curing area 28 may be heated as to thermally cure the elastomeric shell or illuminated with radiation to provide photo-initiated curing. The cured core-shell droplets are collected and further used to make expandable and deformable electrical circuit components. Because of the polymeric shell material, corrosion of metal surfaces and electrical contacts by the oxide coating may be avoided when using the encapsulated GaLMA in electrical devices and circuits.

The electrical properties of the GaLMA/microcapsule core/shell materials may be adjusted over a wide range by selecting different conductive polymeric materials used to form the shell of the microcapsule or by coating the microcapsules with conductive or resistive materials. Accordingly, the polymeric shell material may be selected from poly(alkyl-methacrylate), polysiloxane, polyurethane, poly(aniline), polypyrrole, polythiophene, poly(ethylenedioxythiophene), and poly(p-phenylene vinylene). The polymeric shell may have a shell thickness ranging from about 10 to about 20 microns and a mean particle diameter ranging from about 100 µm to about 1 mm. The core volume of the microcapsule may range from about 50 to about 200 microliters.

The encapsulation process uses two main components: a flow source such as a syringe pump, peristaltic pump, or other continuous-throughput pumping system and a double-T platform 10 to create core-shell droplets. The platform 10 can be made from a variety of materials. One example is a transparent polymer polydimethylsiloxane (pdms). The channel geometry is made into a mold, from this mold a pdms casting can be made in the form of the negative of the mold. This casting can be bonded to a flat substrate such as glass via oxygen plasma functionalization. The flow sources can then be connected to their respective channels.

In order to improve the properties of the GaLMA materials so that they remain electrically conductive, the GaLMA materials are disposed in a polymeric microcapsule that has electrical properties. Accordingly, the cured shell and core material may be coated with a conductive metal such as silver or a conductive material such as carbon nanotubes or silver particles may be incorporated into the polymer that is used to encapsulate the GaLMA particles at T-Junction 2.

When working with GaLMAs, two critical behaviors that must be taken into account: First, in the presence of oxygen (air) GaLMAs spontaneously form a thin (1-2 nm) gallium oxide (GaO) skin on the surface of the metal that largely dictates the mechanical, rheological, and electrical attributes of the material. In the absence of the skin, GaLMAs behave much the same as their toxic counterpart, Mercury, in that they flow readily and spontaneously assume those shapes which minimize free surface energy. While the presence of the oxide film acts to stabilize the LM droplets such that they are able to maintain small (millimeter or less) free-standing structures that stick readily to various substrates, the oxide leaves a residue on critical electrical components. Accordingly, by encapsulating the GaLMA in a polymeric microcapsule, the detrimental effects of an oxide coating on the GaLMA particles may be avoided. Also, since the microcapsule material is deformable and is electrically conductive, there is no formation of oxide residue on the electrical components used with the deformable electrically conductive microcapsules made according to the disclosure.

Deformable Yet Mechanically Resilient Microcapsule

Applicants disclose a deformable yet mechanically resilient microcapsule having electrical properties comprising a gallium liquid metal alloy core having from about 60 to about 100 wt. % gallium and at least one alloying metal, and a polymeric shell encapsulating the liquid core, said polymeric shell having conductive properties, said polymeric shell comprising a coating of an electrically conductive material and/or incorporating an electrically conductive material selected from the group consisting of silver particles, gold particles, copper particles, gallium particles, indium particles, gallium/indium alloy particles, mercury particles, aluminum particles, polythiophene, poly(ethylenedioxythiophene), polyaniline, graphene, carbon nanotubes, fullerenes, and mixtures thereof; preferably said electrically conductive material is selected from the group consisting of silver particles, gold particles, copper particles, gallium particles, indium particles, gallium/indium alloy particles, mercury particles, aluminum particles, graphene, carbon nanotubes, and mixtures thereof; more preferably said electrically conductive material is selected from the group consisting of silver particles, gold particles, copper particles, gallium particles, indium particles, gallium/indium alloy particles, mercury particles, aluminum particles and mixtures thereof; most preferably said electrically conductive material is selected from the group consisting of silver particles, gallium particles, indium particles, gallium/indium alloy particles and mixtures thereof.

Applicants disclose the deformable microcapsule of Paragraph 00028, wherein the gallium liquid metal alloy comprises gallium and indium.

Applicants disclose the deformable microcapsule of Paragraphs 00028 through 00029 wherein the gallium liquid metal alloy further comprises tin.

Applicants disclose the deformable microcapsule of Paragraphs 00028 through 00030 wherein the gallium liquid metal alloy comprises about 62 wt % to about 95 wt % gallium; about 5 wt % to about 22 wt % indium; and about 0 wt % to about 16 wt % Sn.

Applicants disclose the deformable microcapsule of Paragraph 00028, wherein the alloying metal is selected from the group consisting of tin, silver, gold, thallium, cesium, palladium, platinum, sodium, selenium, lithium, potassium, zinc, copper, cadmium, bismuth, indium, antimony, lead, and combinations of two or more of the foregoing.

Applicants disclose the deformable microcapsule of Paragraphs 00028 through 00032 wherein the polymeric shell has a thickness ranging from about 10 to about 20 microns.

Applicants disclose the deformable microcapsule of Paragraphs 00028 through 00033 wherein the core has a volume ranging from about 50 to about 200 microliters.

Applicants disclose the deformable microcapsule of Paragraphs 00028 through 00034 wherein the microcapsule has a mean particle diameter ranging from about 100 µm to about 1 mm.

Applicants disclose the deformable microcapsule of Claim 1, wherein the polymeric shell comprises a material selected from the group consisting of poly(alkyl-methacrylate), polysiloxane, polyurethane, poly(aniline), polypyrrole, polythiophene, poly(ethylenedioxythiophene), poly(p-phenylene vinylene), and mixtures thereof.

Method for Making Deformable Microcapsules

Applicants disclose a method for making deformable microcapsules containing a gallium liquid metal alloy core, the method comprising the steps of:

providing a double-T-junction apparatus having a first T-junction and a second T-junction;

flowing at a rate of about 0.1 mL/Hr a gallium liquid metal alloy emulsion to the first T-junction containing a first aqueous carrier fluid to form first droplets in the first aqueous carrier fluid at a rate of about 100 mL/Hr;

flowing at a rate of about 0.1 mL/Hr the first droplets to the second T-junction containing an emulsion of a polymerizable material in a second carrier fluid flowing at a rate of about 100 mL/Hr to form second droplets containing the first droplets as a core and the polymerizable material as a shell; and polymerizing the polymerizable material to provide the deformable microcapsules containing the gallium liquid metal alloy core, wherein the shell of the deformable microcapsules has conductive properties, said polymeric shell comprising a coating of an electrically conductive material and/or incorporating an electrically conductive material selected from the group consisting of silver particles, gold particles, copper particles, gallium particles, indium particles, gallium/indium alloy particles, mercury particles, aluminum particles, polythiophene, poly(ethylenedioxythiophene), polyaniline, graphene, carbon nanotubes, fullerenes, and mixtures thereof; preferably said electrically conductive material is selected from the group consisting of silver particles, gold particles, copper particles, gallium particles, indium particles, gallium/indium alloy particles, mercury particles, aluminum particles, graphene, carbon nanotubes, and mixtures thereof; more preferably said electrically conductive material is selected from the group consisting of silver particles, gold particles, copper particles, gallium particles, indium particles, gallium/indium alloy particles, mercury particles, aluminum particles and mixtures thereof; most preferably said electrically conductive material is selected from the group consisting of silver particles, gallium particles, indium particles, gallium/indium alloy particles and mixtures thereof.

Applicants disclose the method of Paragraph 00036, wherein the gallium liquid metal alloy comprises gallium and indium.

Applicants disclose the method of Paragraphs 00036 through 00037 wherein the gallium liquid metal alloy further comprises tin.

Applicants disclose the method of Paragraphs 00036 through 00038 wherein the gallium liquid metal alloy comprises about 62 wt % to about 95 wt % gallium; about 5 wt % to about 22 wt % indium; and about 0 wt % to about 16 wt % Sn.

Applicants disclose the method of Paragraphs 00036 through 00039 wherein the alloying metal is selected from the group consisting of tin, silver, gold, thallium, cesium, palladium, platinum, sodium, selenium, lithium, potassium, zinc, copper, cadmium, bismuth, indium, antimony, lead, and combinations of two or more of the foregoing.

Applicants disclose the method of Paragraphs 00036 through 00040 wherein the microcapsules have a shell thickness ranging from about 10 to about 20 microns.

Applicants disclose the method of Paragraphs 00036 through 00041 wherein the core has a volume ranging from about 50 to about 200 microliters.

Applicants disclose the method of wherein Paragraphs 00036 through 00042 the microcapsules have a mean particle diameter ranging from about 100 μm to about 1 mm.

Applicants disclose the method of Paragraphs 00036 through 00043 wherein the polymerizable material is selected from the group consisting of poly(alkyl-methacrylate), polysiloxane, polyurethane, poly(aniline), plypyrrole, polythiophene, poly(ethylenedioxythiophene), poly(p-phenylene vinylene), and mixtures thereof.

Deformable Circuit Component Having Electrical Properties

Applicants disclose a deformable circuit component having electrical properties comprising an electrical element containing microcapsules having electrical properties, wherein the microcapsules comprise a gallium liquid metal alloy core having from about 60 to about 85 wt. % gallium and at least one alloying metal, and a polymeric shell encapsulating the liquid core, said polymeric shell having conductive properties, said polymeric shell comprising a coating of an electrically conductive material and/or incorporating an electrically conductive material selected from the group consisting of silver particles, gold particles, copper particles, gallium particles, indium particles, gallium/indium alloy particles, mercury particles, aluminum particles, polythiophene, poly(ethylenedioxythiophene), polyaniline, graphene, carbon nanotubes, fullerenes, and mixtures thereof; preferably said electrically conductive material is selected from the group consisting of silver particles, gold particles, copper particles, gallium particles, indium particles, gallium/indium alloy particles, mercury particles, aluminum particles, graphene, carbon nanotubes, and mixtures thereof; more preferably said electrically conductive material is selected from the group consisting of silver particles, gold particles, copper particles, gallium particles, indium particles, gallium/indium alloy particles, mercury particles, aluminum particles and mixtures thereof; most preferably said electrically conductive material is selected from the group consisting of silver particles, gallium particles, indium particles, gallium/indium alloy particles and mixtures thereof.

Applicants disclose the deformable circuit component of Paragraph 00045 wherein the gallium liquid metal alloy comprises gallium and indium.

Applicants disclose the deformable circuit component of Paragraphs 00045 through 00046 wherein the gallium liquid metal alloy further comprises tin.

Applicants disclose the deformable circuit component of Paragraphs 00045 through 00047 wherein the gallium liquid metal alloy comprises about 62 wt % to about 95 wt % gallium; about 5 wt % to about 22 wt % indium; and about 0 wt % to about 16 wt % Sn.

Applicants disclose the deformable circuit component of Paragraphs 00045 through 00048 wherein the alloying metal is selected from the group consisting of tin, silver, gold, thalium, cesium, palladium, platinum, sodium, selenium, lithium, potassium, zinc, copper, cadmium, bismuth, indium, antimony, lead, and combinations of two or more of the foregoing.

Applicants disclose the deformable circuit component of Paragraphs 00045 through 00049 wherein the polymeric shell has a thickness ranging from about 10 to about 20 microns.

Applicants disclose the deformable circuit component of Paragraphs 00045 through 00050 wherein the core has a volume ranging from about 50 to about 200 microliters.

Applicants disclose the deformable circuit component of Paragraphs 00045 through 00051 wherein the microcapsule has a mean particle diameter ranging from about 100 μm to about 1 mm.

It is noted that, as used in this specification and the appended claims, the singular forms "a," "an," and "the," include plural referents unless expressly and unequivocally limited to one referent. Thus, for example, reference to "an antioxidant" includes two or more different antioxidants. As used herein, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A deformable yet mechanically resilient microcapsule having electrical properties comprising a gallium liquid metal alloy core having from about 60 to about 100 wt. % gallium and at least one alloying metal, and a polymeric shell encapsulating the liquid core, said polymeric shell having conductive properties, said polymeric shell comprising a coating of an electrically conductive material and/or incorporating an electrically conductive material selected from the group consisting of silver particles, gold particles, copper particles, gallium particles, indium particles, gallium/indium alloy particles, mercury particles, aluminum particles, polythiophene, poly(ethylenedioxythiophene), polyaniline, graphene, carbon nanotubes, fullerenes, and mixtures thereof.

2. The deformable microcapsule of claim 1, wherein the gallium liquid metal alloy comprises gallium and indium.

3. The deformable microcapsule of claim 2, wherein the gallium liquid metal alloy further comprises tin.

4. The deformable microcapsule of claim 1, wherein the gallium liquid metal alloy comprises about 62 wt % to about 95 wt % gallium; about 5 wt % to about 22 wt % indium; and about 0 wt % to about 16 wt % Sn.

5. The deformable microcapsule of claim 1, wherein the alloying metal is selected from the group consisting of tin, silver, gold, thallium, cesium, palladium, platinum, sodium, selenium, lithium, potassium, zinc, copper, cadmium, bismuth, indium, antimony, lead, and combinations of two or more of the foregoing.

6. The deformable microcapsule of claim 1, wherein the polymeric shell has a thickness ranging from about 10 to about 20 microns.

7. The deformable microcapsule of claim 1, wherein the core has a volume ranging from about 50 to about 200 microliters.

8. The deformable microcapsule of claim 1, wherein the microcapsule has a mean particle diameter ranging from about 100 µm to about 1 mm.

9. The deformable microcapsule of claim 1, wherein said electrically conductive material is selected from the group consisting of silver particles, gold particles, copper particles, gallium particles, indium particles, gallium/indium alloy particles, mercury particles, aluminum particles, graphene, carbon nanotubes, and mixtures thereof.

10. The deformable microcapsule of claim 9 wherein, said electrically conductive material is selected from the group consisting of silver particles, gold particles, copper particles, gallium particles, indium particles, gallium/indium alloy particles, mercury particles, aluminum particles and mixtures thereof.

11. The deformable microcapsule of claim 10, wherein said electrically conductive material is selected from the group consisting of silver particles, gallium particles, indium particles, gallium/indium alloy particles and mixtures thereof.

12. The deformable microcapsule of claim 1, wherein the polymeric shell comprises a material selected from the group consisting of poly(alkyl-methacrylate), polysiloxane, polyurethane, poly(aniline), polypyrrole, polythiophene, poly(ethylenedioxythiophene), poly(p-phenylene vinylene), and mixtures thereof.

* * * * *